US011410048B2

(12) United States Patent
Misu et al.

(10) Patent No.: US 11,410,048 B2
(45) Date of Patent: Aug. 9, 2022

(54) SYSTEMS AND METHODS FOR ANOMALOUS EVENT DETECTION

(71) Applicant: Honda Motor Co., Ltd., Tokyo (JP)

(72) Inventors: Teruhisa Misu, Mountain View, CA (US); Vidyasagar Sadhu, New Brunswick, NJ (US); Dario Pompili, Hillsborough, NJ (US)

(73) Assignee: HONDA MOTOR CO., LTD., Tokyo (JP)

( * ) Notice: Subject to any disclaimer, the term of this patent is extended or adjusted under 35 U.S.C. 154(b) by 538 days.

(21) Appl. No.: 16/415,256

(22) Filed: May 17, 2019

(65) Prior Publication Data

US 2020/0364579 A1 Nov. 19, 2020

(51) Int. Cl.
| | |
|---|---|
| *G06N 3/08* | (2006.01) |
| *G06N 3/04* | (2006.01) |
| *G05D 1/00* | (2006.01) |
| *B60W 10/18* | (2012.01) |
| *B60W 30/18* | (2012.01) |
| *B60W 10/20* | (2006.01) |

(52) U.S. Cl.
CPC ............ *G06N 3/088* (2013.01); *B60W 10/18* (2013.01); *B60W 10/20* (2013.01); *B60W 30/18* (2013.01); *G05D 1/0088* (2013.01); *G06N 3/0445* (2013.01); *B60W 2400/00* (2013.01); *B60W 2710/18* (2013.01); *B60W 2710/20* (2013.01)

(58) Field of Classification Search
CPC .. B60W 10/18; B60W 10/20; B60W 2400/00; B60W 2710/18; B60W 2710/20; B60W 30/18; G05D 1/0088; G06N 3/0445; G06N 3/0454; G06N 3/084; G06N 3/088
See application file for complete search history.

(56) References Cited

U.S. PATENT DOCUMENTS

| | | | | |
|---|---|---|---|---|
| 10,373,070 B2 * | 8/2019 | Brew | .................. | G06F 11/0751 |
| 10,684,909 B1 * | 6/2020 | August | ............... | G06F 11/0709 |
| 11,074,514 B2 * | 7/2021 | Caffrey | .................. | G06N 5/048 |

(Continued)

OTHER PUBLICATIONS

Digital Trends, "Volvo to Release Level 4 Autonomous XC90 in 2021," https://www.digitaltrends.com/cars/volvo-xc-90-level-4-autonomy/, 2018.

(Continued)

*Primary Examiner* — Babar Sarwar
(74) *Attorney, Agent, or Firm* — Rankin, Hill & Clark LLP

(57) ABSTRACT

According to one aspect, anomalous event detection based on deep learning may include a system for anomalous event detection for a device. The system includes a computing device having a processor, an encoding module, and a decoding module. The processor is configured to receive sensor data. The encoding module generates reconstruction data based on the sensor data, identifies at least one reconstruction error in the reconstruction data, and determines an anomaly score based on the at least one reconstruction error. The decoding module generates an action prediction based on the sensor data and determines a likelihood value based on the action prediction. The processor can then calculate a scaled anomaly score based on the anomaly score and the likelihood value and causes the processor to execute an action based on the scaled anomaly score.

20 Claims, 5 Drawing Sheets

(56) References Cited

U.S. PATENT DOCUMENTS

| | | | | |
|---|---|---|---|---|
| 2003/0055610 | A1* | 3/2003 | Webber | G06F 17/15 702/194 |
| 2011/0035188 | A1* | 2/2011 | Martinez-Heras | G05B 23/021 702/189 |
| 2015/0110357 | A1* | 4/2015 | Bala | G06K 9/6249 382/104 |
| 2018/0165576 | A1* | 6/2018 | Latapie | G06N 3/0472 |
| 2019/0130669 | A1* | 5/2019 | Boggio | G05B 23/024 |
| 2019/0182280 | A1* | 6/2019 | La Marca | H04L 43/04 |
| 2019/0235482 | A1* | 8/2019 | Subramaniyan | G05B 23/0243 |
| 2019/0286506 | A1* | 9/2019 | Cheng | G06N 3/088 |
| 2020/0104639 | A1* | 4/2020 | Didari | G06K 9/6257 |
| 2020/0293657 | A1* | 9/2020 | Chai | G06F 11/3452 |

OTHER PUBLICATIONS

Twitter, "Introducing practical and robust anomaly detection in a time series," 2015. [Online]. Available: https://blog.twitter.com/engineering/en_us/a/2015/introducing-practical-and-robust-anomaly-detection-in-a-time-series.html.

Netflix, "RAD—Outlier Detection on Big Data," http://techblog.netflix.com/2015/02/rad-outlier-detection-on-big- data.html, 2015.

D. B. Araya, K. Grolinger, H. F. ElYamany, M. A. Capretz, and G. Bitsuamlak, "An ensemble learning framework for anomaly detection in building energy consumption," Energy and Buildings, vol. 144, pp. 191-206, 6 2017.

Capozzoli, F. Lauro, and I. Khan, "Fault detection analysis using data mining techniques for a cluster of smart office buildings," Expert Systems with Applications, vol. 42, No. 9, pp. 4324-4338, 6 2015.

D. Hallac, S. Bhooshan, M. Chen, K. Abida, R. Sosic, and J. Leskovec, "Drive2Vec: Multiscale State-Space Embedding of Vehicular Sensor Data," in 2018 21st International Conference on Intelligent Transportation Systems (ITSC). IEEE, 11 2018, pp. 3233-3238.

M. A. Hayes and M. A. Capretz, "Contextual anomaly detection framework for big sensor data," Journal of Big Data, vol. 2, No. 1, p. 2, 12 2015.

D. P. Kingma and J. Ba, "Adam: A Method for Stochastic Optimization," in International Conference on Learning Representations, San Diego, CA, USA, 5 2015.

P. Malhotra, A. Ramakrishnan, G. Anand, L. Vig, P. Agarwal, and G. Shroff, "LSTM-based Encoder-Decoder for Multi-sensor Anomaly Detection," in Anomaly Detection Workshop, International Conference on Machine Learning (ICML), New York, NY, USA, 2016.

P. Malhotra, L. Vig, G. Shroff, and P. Agarwal, "Long Short Term Memory Networks for Anomaly Detection in Time Series," in European Symposium on Artificial Neural Networks, Bruges Belgium, 2015.

V. Ramanishka, Y.-T. Chen, T. Misu, and K. Saenko, "Toward Driving Scene Understanding: A Dataset for Learning Driver Behavior and Causal Reasoning," in Conference on Computer Vision and Pattern Recognition (CVPR), 2018.

A. Taylor, S. Leblanc, and N. Japkowicz, "Anomaly Detection in Automobile Control Network Data with Long Short-Term Memory Networks," in 2016 IEEE International Conference on Data Science and Advanced Analytics (DSAA). IEEE, 10 2016, pp. 130-139.

M. Toledano, I. Cohen, Y. Ben-Simhon, and I. Tadeski, "Real-time anomaly detection system for time series at scale," in Proceedings of the KDD: Workshop on Anomaly Detection in Finance, ser. Proceedings of Machine Learning Research, vol. 71, 2018, pp. 56-65.

* cited by examiner

SYSTEMS AND METHODS FOR ANOMALOUS EVENT DETECTION

BACKGROUND

Artificial intelligence (AI) systems are becoming increasingly prevalent. AI devices, including machine learning, deep learning, etc., are systems that perceive an environment and take an action to affect a goal. For example, autonomous vehicle systems are AI systems that combine sensors and software to control, navigate, and operate a vehicle. One challenge in training AI devices is the scarcity of data regarding anomalous events because, by definition, anomalous events occur rarely. For example, anomalous driving events constitute the long tail of rare driving events on a Gaussian considering all events and comprise less than 0.01% of all events in a given a driving dataset.

BRIEF DESCRIPTION

According to one aspect, a system for anomalous event detection for a device capable of at least some degree of artificial intelligence. The system includes a computing device having a processor, an encoding module, and a decoding module. The processor is configured to receive sensor data. The encoding module generates reconstruction data based on the sensor data, identifies at least one reconstruction error in the reconstruction data, and determines an anomaly score based on the at least one reconstruction error. The decoding module generates an action prediction based on the sensor data and determines a likelihood value based on the action prediction. The processor can then calculate a scaled anomaly score based on the anomaly score and the likelihood value and causes the processor to execute an action based on the scaled anomaly score.

According to one aspect, a system for anomalous event detection in a vehicle. The system includes a computing device having a processor, an encoding module, and a decoding module. The processor is configured to receive sensor data from one or more vehicle sensors. The encoding module generates reconstruction data based on the sensor data, identifies at least one reconstruction error in the reconstruction data, and determines an anomaly score based on the at least one reconstruction error. The reconstruction data is indicative of past events associated with the vehicle. The decoding module generates an action prediction based on the sensor data and determines a likelihood value based on the action prediction. The processor can then calculate a scaled anomaly score based on the anomaly score and the likelihood value and causes the vehicle to execute an action based on the scaled anomaly score.

According to one aspect, a non-transitory computer readable storage medium storing instructions that when executed by a computer, which includes a processor perform a method for detecting an anomalous event. The method includes receiving sensor data. The method also includes generating reconstruction data based on the sensor data. The method further includes identifying at least one reconstruction error in the reconstruction data. Additionally, the method includes determining an anomaly score based on the at least one reconstruction error. An action prediction is also generated based on the sensor data. The method also includes determining a likelihood value based on the action prediction. The method further includes calculating a scaled anomaly score based on the anomaly score and the likelihood value. An action is then executed based on the scaled anomaly score.

DETAILED DESCRIPTION

Figure 1:
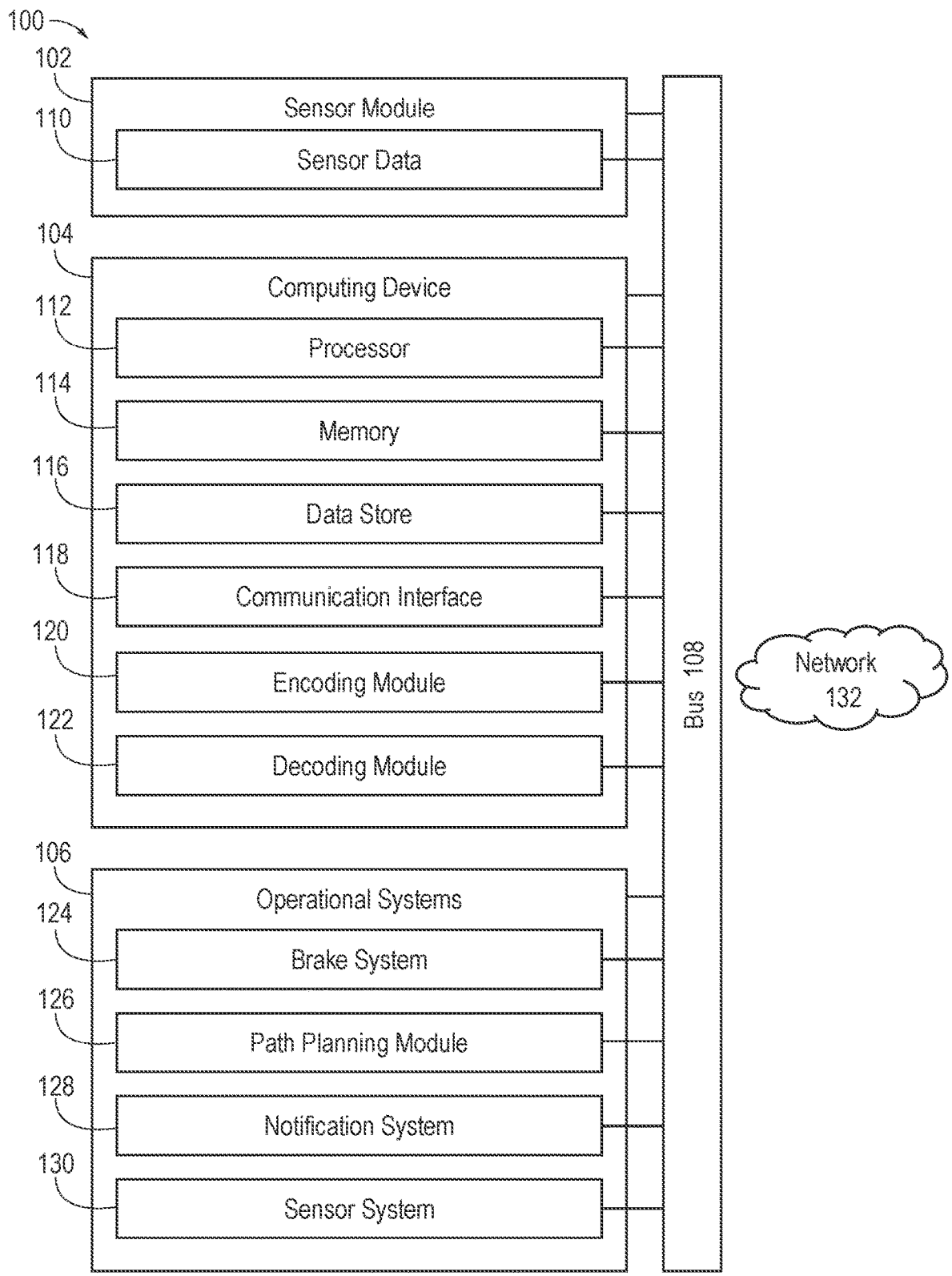
FIG. 1 is an exemplary component diagram of a system for anomalous event detection, according to one aspect.

It is difficult to train AI devices to cope with anomalous events because anomalous events are rare. The systems and methods described herein detect anomalous events and use the anomalous events to train the AI devices to handle these rare situations. This can be achieved, for example, via weighted training—give more weight to learning anomalous scenarios than normal scenarios. For autonomous driving embodiments, detecting anomalous driving scenarios ahead of time can help prevent accidents in some cases. For example, an AI device may detect the anomalous event and take a corrective action, such as a corrective maneuver, so as to steer the system in a safe direction (e.g., apply appropriate control signals or if possible, handing over the control to a human driver, etc.).

An anomalous event is any unusual pattern (such as abruptness, rarity, etc.) among different modalities of data. For clarity, anomalous events will be described with respect to vehicle scenarios, however, anomalous events may also be detected for AI devices associated with, but not limited to, robotics and mobility devices such as prosthetics, among others. With regard to a vehicle scenario, an unusual pattern may occur due to unusual reaction of vehicle occupant, for example a sudden pressure on a brake pedal, accelerator, and/or steering wheel, among others, may imply that the vehicle occupant has undergone a challenging (anomalous) driving situation.

Though model-based (i.e., rule-based) approaches can be used to detect anomalies in multi-modal time-series data, they are good only for simple cases such as threshold based anomaly detection. For example, a model-based approach may include a rule that a predetermined rate of deceleration greater than a threshold is defined as anomalous. However, it is difficult as well as tedious to compose rules for complex and even unknown situations. Conversely, data-driven approaches learn representations directly from the data, and use the representations to detect anomalies. However, the performance of data-driven approaches is only as good as the data, and given the rare occurrence of anomalous events, data-driven approaches alone typically do not have the requisite data to adequately train an AI device.

The systems and methods described herein use an encoding module to generate reconstruction data and identify reconstruction errors. The reconstruction data uses raw sensor data to establish past events. The reconstruction-error based approach is leveraged by domain-knowledge. In the vehicle example, the domain knowledge is based on the availability of maneuver labels that predict possible future maneuvers that may be made by the device, such as a vehicle. The maneuver labels are utilized by a decoding module in conjunction with the encoding module. The decoding module acts as a regularizer to the encoding module, thereby achieving a multi-task learning system with better performance than a standalone encoder.

DEFINITIONS

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wide-band (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface," as used herein can include input and/or output devices for receiving input and/or devices for outputting data. The input and/or output can be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle that is capable of carrying one or more users and is powered by any form of energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more users. Further, the term "vehicle" can include vehicles that are automated or non-automated with pre-determined paths or free-moving vehicles.

A "vehicle occupant," as used herein can include, but is not limited to, one or more biological beings located in the vehicle. The vehicle occupant can be a driver or a passenger of the vehicle. The vehicle occupant can be a human (e.g., an adult, a child, an infant).

"Vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

I. Systems Overview

Referring now to the drawings, the drawings are for purposes of illustrating one or more exemplary embodiments and not for purposes of limiting the same. FIG. 1 is an exemplary component diagram of an operating environment 100 for anomalous event detection based deep learning, according to one aspect. The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments.

The computing device 104 may be implemented with a device or remotely stored. For example, with respect to a vehicle embodiment, the computing device 104 may be implemented as part of a telematics unit, a head unit, a navigation unit, an infotainment unit, an electronic control unit, among others of a vehicle, such as the vehicle 302 shown in FIG. 3. In other embodiments, the components and functions of the computing device 104 can be implemented, for example, with other devices 530 (e.g., a portable device) or another device connected via a network (e.g., a network 132). The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment.

The computing device 104 includes a processor 112, a memory 114, a data store 116, and a communication interface 118, which are each operably connected for computer communication via a bus 108 and/or other wired and wireless technologies. The communication interface 118 provides software and hardware to facilitate data input and output between the components of the computing device 104 and other components, networks, and data sources, which will be described herein. Additionally, the computing device 104 also includes an encoding module 120 and a decoding module 122, for detecting anomalous events facilitated by the components of the operating environment 100.

The encoding module 120 may be an artificial neural network that acts as a framework for machine learning, including deep learning. For example, the encoding module 120 may be an autoencoder that determines the representations need to classify the sensor data 110 such that the autoencoder operates in an unsupervised manner. In one embodiment, the encoding module 120 may be a long short-term memory (LSTM) or other artificial recurrent neural network that can classify, process, and make predictions based on time series data, such that the encoding module 120 is not sensitive to gaps in timing between events. The encoding module 120 may include convolutional layers and bi-directional LSTM layers. The convolutional layers capture inter-channel spatial correlations. The convolutional layers may include one dimensional (i.e., 1D) convolutional layers. The bi-directional LSTM layers capture inter-channel and intra-channel temporal correlations since the input sequence may include temporal patterns in both directions (e.g., forward and backward).

The decoding module 122 may be a symbol predictor that converts the data generated by the encoding module 120 to control signals. In some embodiments, the encoding module 120 and the decoding module 122 operate according to a sequence to sequence model such that input sequences from the encoding module 120 can be mapped to output sequences of the decoding module 122 that are a different length than the input sequences. The predicted labels of the decoding module 122 may be labels that correspond to future actions based on the sensor data 110. Continuing the vehicular example given above, the label may correspond to a predicted maneuver of the vehicle 302. In some embodiments, the predicted maneuver may include a series of maneuvers (e.g., going-straight, right-turn, left-turn, decelerate, etc.). These labels may be obtained from manually input annotated data, such as manual driving data. In some embodiments, the labels may be directed to maneuvers of the vehicle Additionally, or alternatively the labels may be learned or received from a remote server (not shown).

The computing device 104 is also operably connected for computer communication (e.g., via the bus 108 and/or the communications interface 118) to one or more operational systems 106. The operational systems 106 can include, but are not limited to, any automatic or manual systems that can be used to enhance the device, operation, and/or safety. The operational systems 106 may dependent on the implementation. For example, given a vehicular embodiment, the operational systems 106 include a brake system 124, a path planning module 126, a notification system 128, and a sensor system 130 according to an exemplary embodiment. The brake system 124 monitors, analyses, and calculates braking information and facilitates features like anti-lock brake system, a brake assist system, and an automatic brake prefill system. The path planning module 126 monitors, analyses, operates the device to some degree. For example, the path planning module 126 may store, calculate, and provide directional information and facilitates features like vectoring and obstacle avoidance among others. The notification system 128 identifies notifications, generates notifications, and facilitates communication.

The operational systems 106 also include and/or are operably connected for computer communication to the sensor system 130. The sensor system 130 provides and/or senses information associated with a device (e.g., the vehicle 302), the operating environment 100, an environment of the device, and/or the operational systems 106. The sensor system 130 can include, but is not limited to, environmental sensors, vehicle speed sensors, accelerator pedal sensors, brake sensors, wheel sensors, among others. In some embodiments, the sensor system 130 is incorporated with the operational systems 106. For example, one or more sensors of the sensor system 130 may be incorporated with the brake system 124 monitor characteristics of the vehicle 302, such as deceleration.

Accordingly, the sensor system 130 is operable to sense a measurement of data associated with the device, the operating environment 100, the device environment, and/or the operational systems 106 and generate a data signal indicating said measurement of data. These data signals can be converted into other data formats (e.g., numerical) and/or used by the sensor module 102, the computing device 104, and/or the operational systems 106 to generate other data metrics and parameters. It is understood that the sensors can be any type of sensor, for example, acoustic, electric, environmental, optical, imaging, light, pressure, force, thermal, temperature, proximity, among others.

The sensor module 102, the computing device 104, and/or the operational systems 106 are also operatively connected for computer communication to the network 132. The network 132 is, for example, a data network, the Internet, a wide area network (WAN) or a local area (LAN) network. The network 132 serves as a communication medium to various remote devices (e.g., databases, web servers, remote servers, application servers, intermediary servers, client machines, other portable devices). Using the system and network configuration discussed above, anomalous events can be detected. Detailed embodiments describing exemplary methods using the system and network configuration discussed above will now be discussed in detail.

II. Methods Overview

Figure 2:
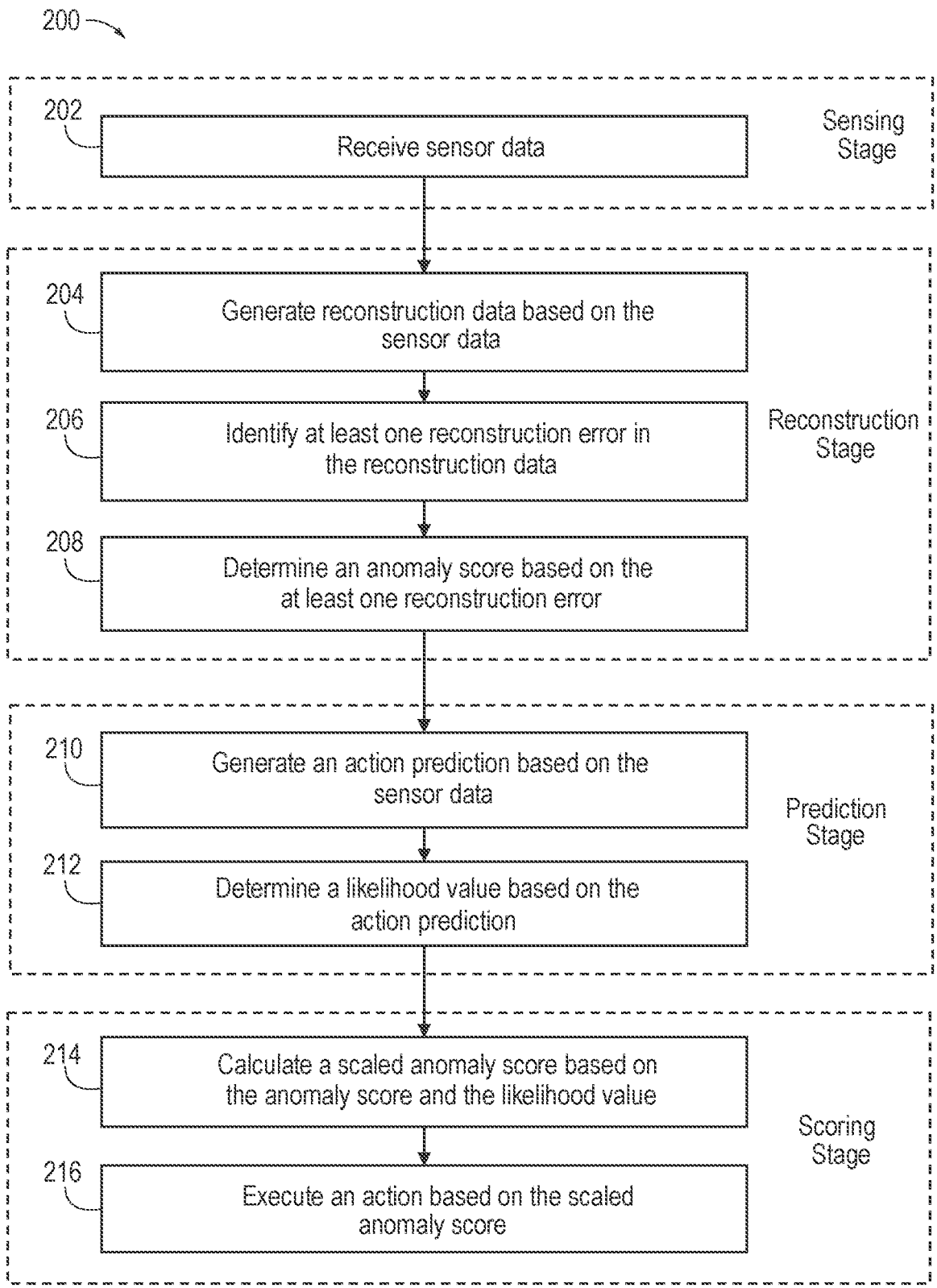
FIG. 2 is an exemplary process flow of a method for anomalous event detection, according to one aspect.

Referring now to FIG. 2, a method 200 for anomalous event detection will now be described according to an exemplary embodiment. FIG. 2 will also be described with reference to FIGS. 1 and 3.

As shown in FIG. 2, the method for anomalous event detection can be described by four stages, namely, (A) Sensing, (B) Reconstruction, (C) Prediction, and (D) Scoring. For simplicity, the method 200 will be described by these stages, but it is understood that the elements of the method 200 can be organized into different architectures, blocks, stages, and/or processes. For example, the reconstruction and prediction stages may be performed in parallel.

A. Sensing Stage

At block 202, the sensor module 102 and/or the processor receives sensor data 110. The sensor data 110 may be received from the sensor system 130, remote devices (e.g., via the bus 108 and/or the communications interface 118), and/or a biological entity. The sensor data 110 may include a video sequence or a series of images, user inputs, and/or data from the operational systems 106, such as data from a Controller Area Network (CAN) bus including as pedal pressure, steer angle, etc. In some embodiments, the sensor data 110 is augmented as additional sensor data from other sources is received. For example, the data from the CAN bus may be augmented by information about a vehicle occupant, a driving profile, and image/video data, among others.

B. Reconstruction Stage

At block 204, the encoding module 120 generates reconstruction data from the sensor data 110. For example, the encoding module 120 may perform encoder operations in reverse order so as to reconstruct the sensor data 110 to illustrate past events. As discussed above, the encoding module 120 may include a series of 1-dimensional (1D) convolutional layers followed by bi-directional LSTM layers. Accordingly, the encoding module 120 may include a first set of LSTM cells that are fed data in a forward order and a second set of LSTM cells for which the data is fed in the reverse order. The encoding module 120 may include multiple layers of these bi-directional LSTM (bi-LSTM) layers to extract more hierarchical information.

The sensor data 110 is processed through multiple convolutional and bi-LSTM layers by the encoding module as reconstruction data. For example, the sensor data 110 may be received as time series data, $\{x_0, x_1, \ldots x_n\}$, of size n+1 that corresponds to one window of data segmented from the sensor data 110. The sensor data 110 is fed to the encoding module 120 which consist of n+1 LSTM cells, such that each LSTM cell encodes its input and the cell state from previous cell into its own cell state, which is passed onto the next LSTM cell. The cell state of the last LSTM cell has the encoded representation of all of the sensor data 110.

The first LSTM cell takes the embedding as one of the inputs and passes on its cell state to the next cell. The process is repeated for n+1 time steps. During each step, the LSTM cell generates an output a, finally resulting in $\{a_0, a_1, \ldots a_n\}$ after n+1 steps. The reconstruction data is available in the cell states of final LSTM cells and is stored at the sensor module 102 and/or the memory 114. In this manner, reconstruction data is generated in a plurality of cells.

At block 206, at least one reconstruction error is identified in the reconstruction data. For example, the reconstruction error may be calculated as the difference, $|x-a|^2$ using stochastic gradient descent and backpropagation. In another embodiment, the reconstruction errors may be identified using the Mean Square between the sensor data 110 and the reconstruction data. Accordingly, different ways that determine the divergence of the reconstruction data from the sensor data 110.

At block 208 an anomaly score is determined based on the at least one reconstruction error. In some embodiments, the anomaly score is the at least one reconstruction error. In another embodiment, the anomaly score may be determined based on the type of sensor data 110 being measured. For example, the reconstruction errors corresponding to a combined modality may be fit to a variable Gaussian distribution. The anomaly scores may then be calculated as the mahalanobis distances (anomaly scores) for the reconstruction data. Accordingly, the average normalized reconstruction loss of sensor data 110 for different modalities after processing can be determined by the encoding module 120 and used as anomaly score.

The anomaly score is the output of the Reconstruction Stage. The reconstruction error may be larger if non-anomalous classes are present in the sensor data 110 because fully unsupervised reconstruction error-based approaches may be higher. Accordingly, in the Prediction Stage, the decoding module 122 acts as a regularizer to the encoding module 120 because in addition to determining an anomaly score, the computing device 104 is constrained by predicting a label associated with a future score.

C. Prediction Stage

Rather than relying on rule-based labels that define anomalous and non-anomalous events, the Prediction Stage identifies a future action of a device. At block 210, the decoding module 122 generates an action prediction based on the sensor data 110. The decoding module 122 may utilize cell states (e.g., forward cell states) from the encoding module 120. In some embodiments, the decoding module 122 acts as a greedy decoder, where the most probable label output of the previous LSTM cell is fed as input to the next LSTM cell. The first LSTM cell takes a special label <SOS>, denoting start of sequence, as input. Likewise, the last LSTM cell generates <EOS> label, denoting end of sequence. The output labels of all the LSTM cells is the predicted series of action predictions.

At block 212, a likelihood value is determined based on the action prediction. For example, suppose that a series of action predictions are generated. The likelihood values for the action prediction of the series of action predictions may be determined using a weighted cross-entropy loss with weights being the inverse of the frequency of the predicted maneuvers. The weights may then be applied to the action predictions. For example, the weight for a action prediction may be given by:

$$s = \omega_s = 1/f_s^k$$

where $f_s$ is the frequency ratio of action s in the sensor data 110 and k is determined empirically.

D. Scoring Stage

As discussed above with respect to the Reconstruction Stage, the anomaly score may include false positives for anomalous events. To account for the scarcity of sensor data regarding anomalous events, the action predictions, discussed in the Prediction Stage are leveraged to reduce the number of false positives.

At block 214, a scaled anomaly score is calculated based on the anomaly score determined in the Reconstruction Stage and the likelihood value determined in the Prediction Stage. For example, suppose that $\{s_0, s_1, \ldots s_n\}$ correspond to the actions predicted in the Prediction Stage. The actions are then weighted, for example the negative logarithmic likelihood of the action predictions may be calculated according to:

$$-\sum_{i=1}^{n}(\log p(s_i))$$

The anomaly scores are then divided by the negative logarithmic likelihood of the action predictions. For example, suppose that $\{a_0, a_1, \ldots a_n\}$ correspond to the anomaly scores determined in the Reconstruction Stage. The scaled anomaly score may then be calculated according to:

$$\frac{a_i}{-\sum_{i=1}^{n}\log p s_i}$$

The scaled anomaly score is high for more-frequent maneuvers and low for less frequent maneuvers. In this way, rare but non-anomalous situations are weighed down leading to fewer false positives. Accordingly, anomalous events can be more reliably detected and managed.

At block 216, an action is executed based on the scaled anomaly score. For example, detecting anomalous driving scenarios ahead of time can help prevent accidents as the vehicle may be able to take a corrective action so as to steer the system in a safe direction (e.g., apply appropriate control signals or if possible, handing over the control to a human driver, etc.). In another embodiment, the action executed based on the scaled anomaly score may be to train a neural network.

Figure 3:
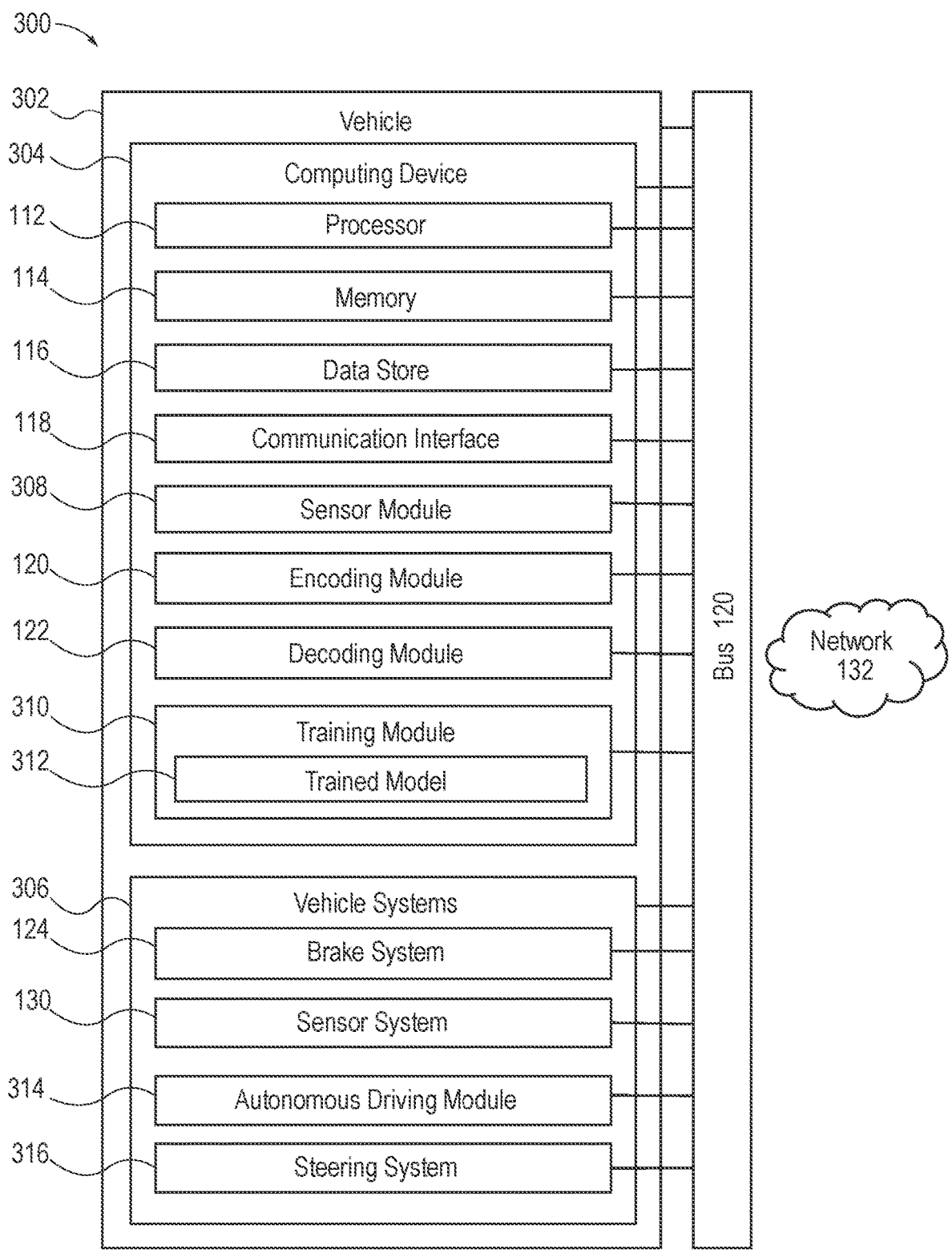
FIG. 3 is another exemplary component diagram of a system for anomalous event detection, according to one aspect.

FIG. 3 is another exemplary component diagram of a system for anomalous event detection, according to one aspect. The systems and methods described herein may be implemented to trained neural network for a vehicle 302. For example, the computing device 304 can be implemented with the vehicle 302 as part of a telematics unit, a head unit, a navigation unit, an infotainment unit, an electronic control unit, among others. In other embodiments, the components and functions of the computing device 304 can be implemented remotely from the vehicle 302, for example, with a portable device or another device connected via a network (e.g., a network 132).

In this embodiment, the computing device 304 includes a sensor module 308 that operates in a substantially similar way as the sensor module 102 described with respect of FIG. 1. The sensor module 308 may include sensors configured for use with a vehicle such as light detection and ranging (LiDAR) and/or radar.

The vehicle systems 306 can include, but are not limited to, any automatic or manual systems that can be used to enhance the vehicle 302, driving, and/or safety. Here, the vehicle systems 306 include the brake system 124, the sensor system 130, an autonomous driving module 314, and a steering system 316. The vehicle systems 306 include and/or are operably connected for computer communication to the sensor system 130. The autonomous driving module 314 facilitates autonomous operation of the vehicle 302 with reduced involvement by a vehicle occupant. The steering system 316 calculate, control, and/or execute steering parameters (e.g., steering angle, steering direction, etc.).

The computing device 304 may also include a training module 310 having a training model 312. The training module 310 may generate a training model 312 and perform the training in a first environment, such as a simulation environment. According to another aspect, the first environment may be the real-world environment. The training model 312 stores data (e.g., memory 114 or data store 116) regarding detecting anomalous event. The training model 312 allows the training module 310 to identify similar events so that the training module 310 can identify anomalous events in the future.

In some embodiments, the computing device 304 may implement the trained model in a second environment based on a scaled anomalous score. According to one aspect, the computing device 304 may implement the trained neural network policy in an autonomous vehicle based on input from a second environment, such as a real-world environment. The input may be determined from the sensor system 130 and/or other system of the vehicle systems 306. The sensor system 130 may be implemented with the vehicle systems 306, can include various types of sensors for use with the vehicle 302. The vehicle sensors of the sensor system 130 may detect and/or sense a parameter of the vehicle 302, the vehicle systems 306, and/or the environment 300 surrounding the vehicle 302.

For example, suppose the sensor data is split into training and testing data windows. Windows of the training and the testing data that directed to known maneuvers may be discarded. For example, those windows in the training data where the majority maneuver is a u-turn may be discarded. Remaining training data may be further divided into sub-windows. The encoding module 120 identifies a maneuver for one or more of the sub-windows. The encoding module 120 then applies autoencoder classifiers to the maneuvers by providing only the data from the corresponding sub-window specific to that maneuver. Anomaly scores that correspond to reconstruction loss values are calculated based on the autoencoder classifiers associated with the encoding module 120. In some embodiments, the lowest of the anomaly scores is considered the reconstruction loss for that test data point.

The training module trains the overall network by minimizing the weighted losses of tasks associated with the encoding module 120, the decoding module 122, and regularization losses. For example, the overall loss, LO, may be given by:

$$LO=wALA+wB\ LB+wRLR,$$

where wA, wB, wR are the weights for LA, LB, LR, the task A, task B and regularization loss respectively. The input may be sensor data 110, such as image capture data from the real-world environment. The trained neural network policy may direct the action selection for the autonomous vehicle. In other words, action selection for the autonomous vehicle may be modeled based on the trained neural network policy, and implemented via the autonomous driving module 314, the computing device 104, and one or more of the vehicle systems 306 (e.g., the steering system 316, the brake system 124, etc.).

Figure 4:
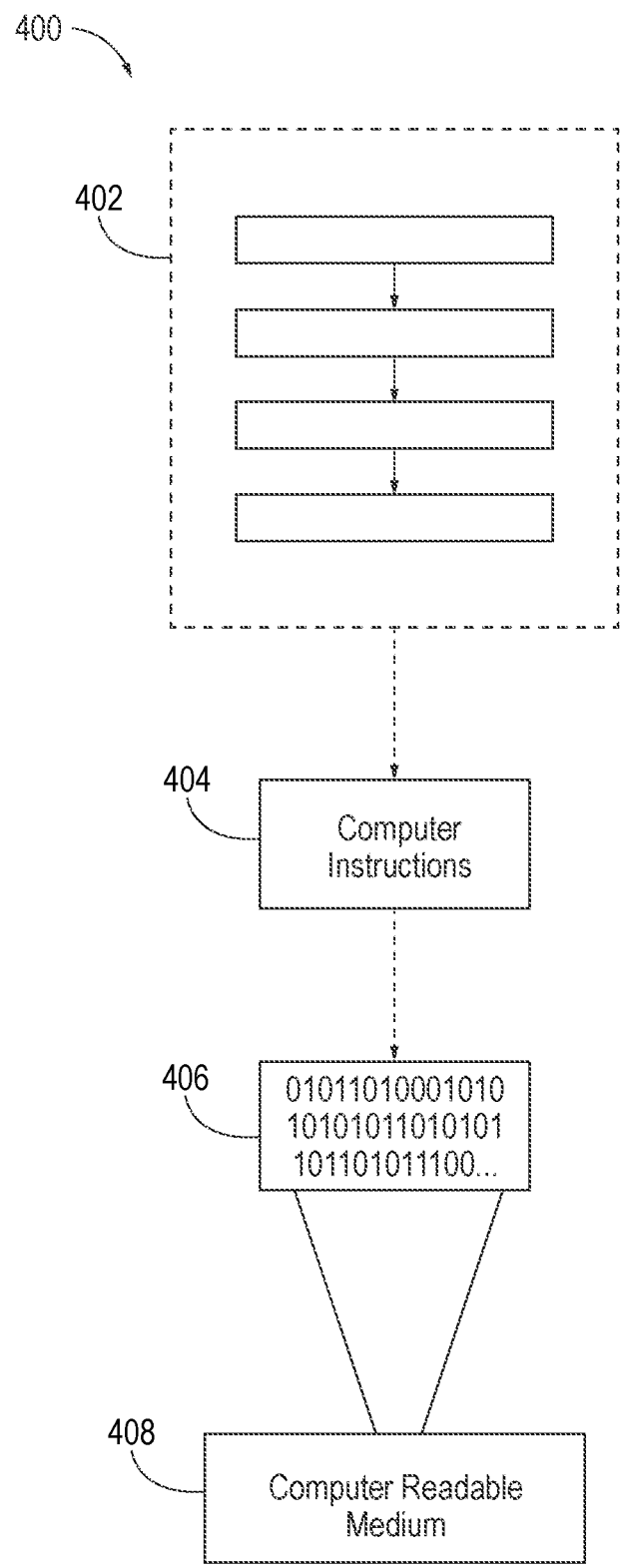
FIG. 4 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation 400, the processor-executable computer instructions 404 may be configured to perform a method 402, such as the method 200 of FIG. 2. In another aspect, the processor-executable computer instructions 404 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
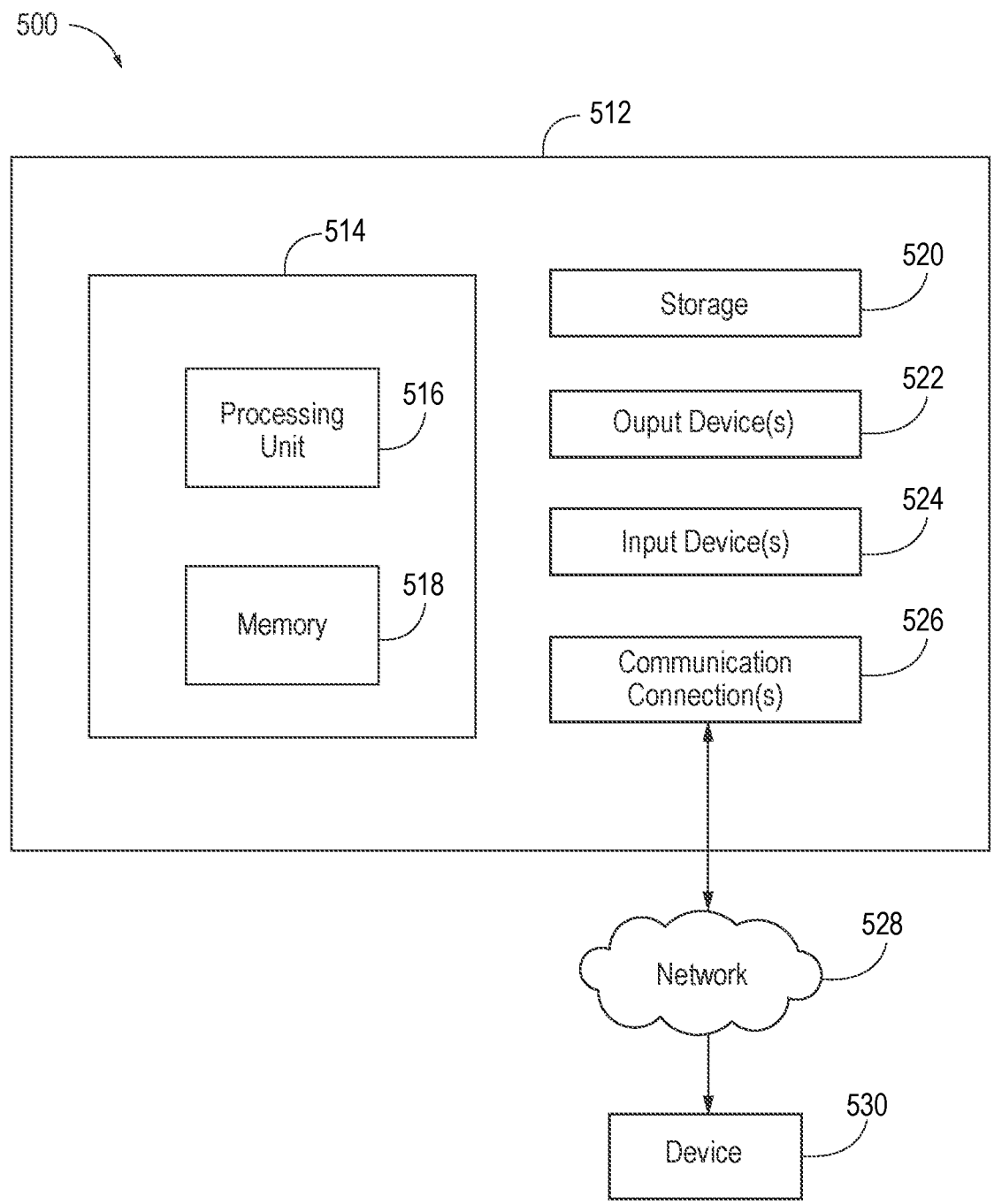
FIG. 5 is an illustration of an example computing environment where one or more of the provisions set forth herein are implemented, according to one aspect.

FIG. 5 and the following discussion provide a description of a suitable computing environment to implement aspects of one or more of the provisions set forth herein. The operating environment of FIG. 5 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including an apparatus 512 configured to implement one aspect provided herein. In one configuration, the apparatus 512 includes at least one processing unit 516 and memory 518. Depending on the exact configuration and type of computing device, memory 518 may be volatile, such as RAM, non-volatile, such as ROM, flash memory, etc., or a combination of the two. This configuration is illustrated in FIG. 5 by dashed line 514.

In other aspects, the apparatus 512 includes additional features or functionality. For example, the apparatus 512 may include additional storage such as removable storage or non-removable storage, including, but not limited to, magnetic storage, optical storage, etc. Such additional storage is illustrated in FIG. 5 by storage 520. In one aspect, computer readable instructions to implement one aspect provided herein are in storage 520. Storage 520 may store other computer readable instructions to implement an operating system, an application program, etc. Computer readable instructions may be loaded in memory 518 for execution by processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 512. Any such computer storage media is part of the apparatus 512.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 512 includes input device(s) 524 such as keyboard, mouse, pen, voice input device, touch input device, infrared cameras, video input devices, or any other input device. Output device(s) 522 such as one or more displays, speakers, printers, or any other output device may be included with the apparatus 512. Input device(s) 524 and output device(s) 522 may be connected to the apparatus 512 via a wired connection, wireless connection, or any combination thereof. In one aspect, an input device or an output device from another computing device may be used as input device(s) 524 or output device(s) 522 for the apparatus 512. The apparatus 512 may include communication connection(s) 526 to facilitate communications with one or more other devices 530, such as through network 528, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for anomalous event detection for a device capable of at least some degree of artificial intelligence, comprising:
a computing device having:
a processor configured to receive sensor data;
an encoding module configured to:
generate reconstruction data based on the sensor data;
identify at least one reconstruction error in the reconstruction data, and
determine an anomaly score based on the at least one reconstruction error; and
a decoding module configured to:
generate an action prediction based on the sensor data; and
determine a likelihood value based on the action prediction,
wherein the processor is further configured to calculate a scaled anomaly score based on the anomaly score and the likelihood value, and cause the device to execute an action based on the scaled anomaly score.

2. The system of claim 1, wherein the encoding module is an autoencoder that operates in an unsupervised manner.

3. The system of claim 1, wherein the encoding module includes at least one convolutional layer and bi-directional long short-term memory (LSTM) layers.

4. The system of claim 1, wherein the decoding module is a symbol predictor.

5. The system of claim 1, wherein the encoding module and the decoding module operate according to a sequence to sequence model.

6. The system of claim 1, wherein the system further includes a training module, and wherein the action executed by the processor is training the device to detect an anomalous event based on the scaled anomaly score.

7. A system for anomalous event detection in a vehicle, comprising:
a computing device having:
a processor configured to receive sensor data from one or more vehicle sensors;
an encoding module configured to:
generate reconstruction data based on the sensor data, wherein the reconstruction data is indicative of past events associated with the vehicle;
identify at least one reconstruction error in the reconstruction data, and
determine an anomaly score based on the at least one reconstruction error; and
a decoding module configured to:
generate an action prediction based on the sensor data; and
determine a likelihood value based on the action prediction,
wherein the processor is further configured to calculate a scaled anomaly score based on the anomaly score and the likelihood value, and cause the vehicle to execute an action based on the scaled anomaly score.

8. The system of claim 7, wherein the encoding module is an autoencoder that operates in an unsupervised manner.

9. The system of claim 7, wherein the encoding module includes at least one convolutional layer and bi-directional long short-term memory (LSTM) layers.

10. The system of claim 7, wherein the decoding module is a symbol predictor.

11. The system of claim 7, wherein the encoding module and the decoding module operate according to a sequence to sequence model.

12. The system of claim 7, wherein the action prediction correspond to labels that are obtained from driving data and are directed to maneuvers of the vehicle.

13. The system of claim 7, wherein the action executed by the vehicle is a corrective maneuver.

14. The system of claim 7, wherein the system further includes a training module, and wherein the action executed by the vehicle is training to detect an anomalous event based on the scaled anomaly score.

15. A non-transitory computer readable storage medium storing instructions that when executed by a computer, which includes a processor to perform a method for detecting an anomalous event, the method comprising:
receiving sensor data;
generating reconstruction data based on the sensor data;
identifying at least one reconstruction error in the reconstruction data;
determining an anomaly score based on the at least one reconstruction error;
generating an action prediction based on the sensor data;
determining a likelihood value based on the action prediction;
calculating a scaled anomaly score based on the anomaly score and the likelihood value; and
executing an action based on the scaled anomaly score.

16. The non-transitory computer readable storage medium of claim 15, wherein the action prediction corresponds to labels that are obtained from manually the sensor data.

17. The non-transitory computer readable storage medium of claim 15, wherein the likelihood value for the action prediction is determined using a weighted cross-entropy loss with weights being an inverse of a frequency of the action prediction.

18. The non-transitory computer readable storage medium of claim 15, wherein the anomaly score is further calculated based on autoencoder classifiers.

19. The non-transitory computer readable storage medium of claim 15, further comprising:
- training the processor to detect anomalous events by minimizing the scaled anomalous score; and
- generating a trained neural network policy that directs an action selection for the executed action.

20. The non-transitory computer readable storage medium of claim 19, wherein the trained neural network policy is implemented by an autonomous driving module.

* * * * *